United States Patent
Engels et al.

(10) Patent No.: US 11,440,586 B2
(45) Date of Patent: Sep. 13, 2022

(54) MOTOR VEHICLE PARKING ASSISTANCE SYSTEM AND METHOD

(71) Applicant: Ford Global Technologies, LLC, Dearborn, MI (US)

(72) Inventors: Frank Peter Engels, Solingen (DE); Muhammad Adeel Awan, Herzogenrath (DE); Oliver Nehls, Nordrhein-Westfalen (DE); Otto Hofmann, Nideggen (DE); Goetz-Phillipp Wegner, Dortmund (DE)

(73) Assignee: Ford Global Technologies, LLC, Dearborn, MI (US)

( * ) Notice: Subject to any disclaimer, the term of this patent is extended or adjusted under 35 U.S.C. 154(b) by 954 days.

(21) Appl. No.: 15/927,631

(22) Filed: Mar. 21, 2018

(65) Prior Publication Data
US 2018/0273092 A1 Sep. 27, 2018

(30) Foreign Application Priority Data
Mar. 22, 2017 (DE) .......................... 102017204830.1

(51) Int. Cl.
*B62D 15/02* (2006.01)
*B60W 30/06* (2006.01)
(52) U.S. Cl.
CPC ......... *B62D 15/0285* (2013.01); *B60W 30/06* (2013.01); *B60T 2201/10* (2013.01)
(58) Field of Classification Search
CPC .............. B62D 15/0285; B60W 30/06; B60W 2540/18; B60T 2201/10
See application file for complete search history.

(56) References Cited

U.S. PATENT DOCUMENTS

| | | | | |
|---|---|---|---|---|
| 5,835,870 | A * | 11/1998 | Kagawa | B62D 1/28 701/23 |
| 6,219,604 | B1 * | 4/2001 | Dilger | B62D 6/003 180/422 |
| 8,170,751 | B2 | 5/2012 | Lee et al. | |
| 8,816,878 | B2 | 8/2014 | Kadowaki et al. | |
| 8,890,716 | B2 * | 11/2014 | Takano | G06F 17/00 340/932.2 |

(Continued)

FOREIGN PATENT DOCUMENTS

DE 102012000297 A1 7/2012
DE 102012206725 A1 10/2013

OTHER PUBLICATIONS

Steve Fankem and Steffen Muller, A New Model to Compute the Desired Steering Torque for Steer-by-wire Vehicles and Driving Simulators, Mar. 14, 2014.

*Primary Examiner* — Fadey S. Jabr
*Assistant Examiner* — Omar K Morsy
(74) *Attorney, Agent, or Firm* — Raymond L. Coppiellie; Burgess Law Office, PLLC

(57) ABSTRACT

A method for assisting entry or exit of a motor vehicle into and from a parking space. The motor vehicle equipped with a steering wheel and at least one steering servomotor capable of applying a steering angle steered wheels of the motor vehicle. A control unit actuates the steering servomotor for carrying out an automatic parking process, in which case, during the parking process there is no mechanical connection between the steering wheel and the steered wheels and the steering wheel does not move.

10 Claims, 1 Drawing Sheet

(56) References Cited

U.S. PATENT DOCUMENTS

| | | | |
|---|---|---|---|
| 8,954,235 B2* | 2/2015 | Lee | B62D 1/286 |
| | | | 701/41 |
| 8,994,521 B2 | 3/2015 | Gazet | |
| 9,199,667 B2* | 12/2015 | Di Cairano | B62D 5/001 |
| 9,272,824 B2 | 3/2016 | Golomb | |
| 9,283,960 B1 | 3/2016 | Lavoie | |
| 9,434,415 B2* | 9/2016 | Lavoie | B62D 15/027 |
| 9,582,003 B1* | 2/2017 | Levandowski | G05D 1/0088 |
| 9,796,416 B2* | 10/2017 | Fujii | B62D 1/286 |
| 2011/0260887 A1 | 10/2011 | Toledo et al. | |
| 2016/0207528 A1 | 7/2016 | Stefan et al. | |
| 2019/0225268 A1* | 7/2019 | Lavoie | B62D 15/0285 |

* cited by examiner

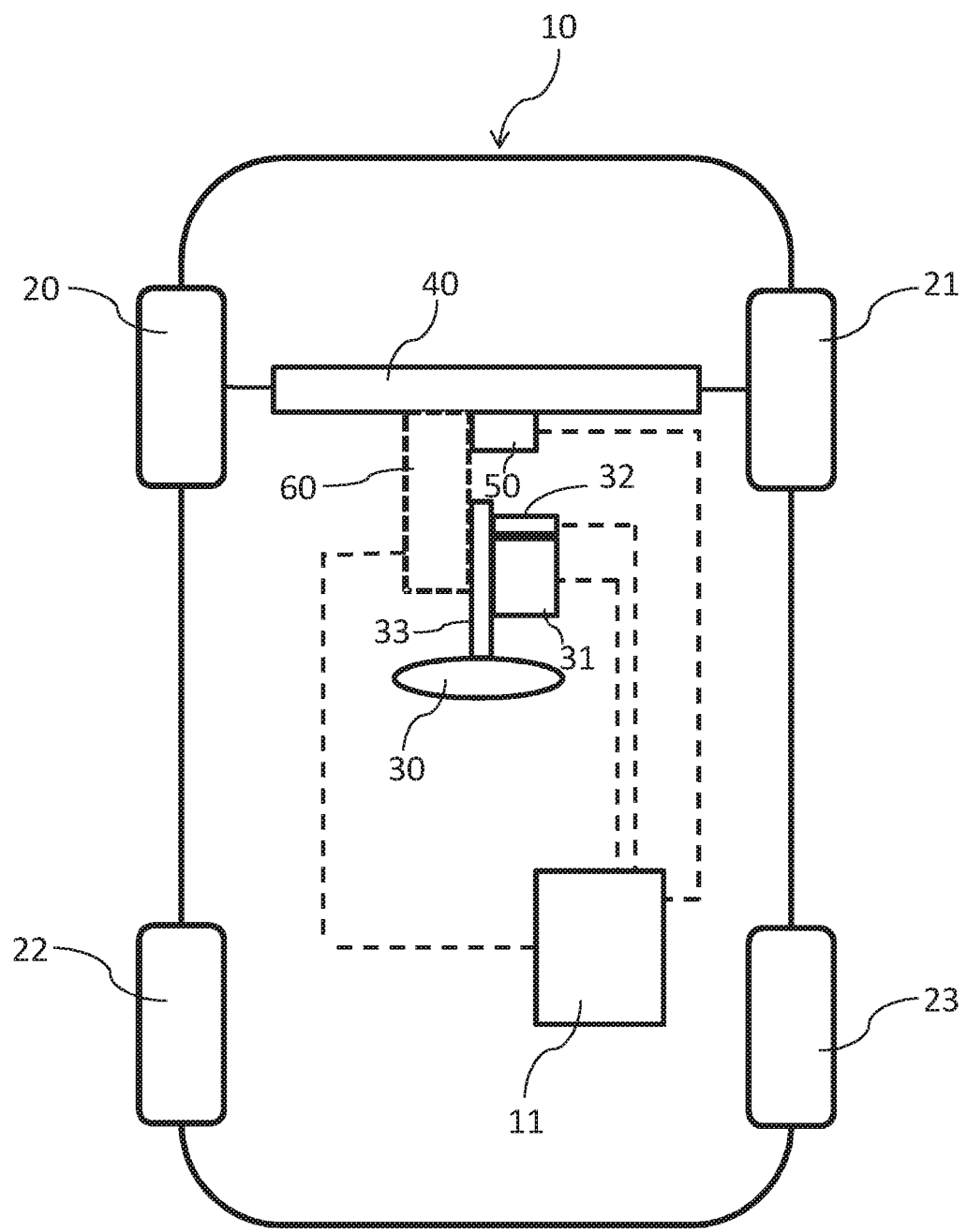

MOTOR VEHICLE PARKING ASSISTANCE SYSTEM AND METHOD

CROSS-REFERENCE TO RELATED APPLICATIONS

Not Applicable.

BACKGROUND OF THE INVENTION

1. Field of the Invention

The invention relates to a method for operating a driver assistance system; and more specifically to a driver assistance system for parking a motor vehicle.

2. Description of Related Art

Automobile steering assistance systems assist a driver during steering maneuvers. In one example, rotation of the steering wheel by the driver causes a steering rack to shift which correspondingly pivots the steered wheels via pinions. An electrohydraulic or electromechanical motor provides an assisting force, or an assisting torque, to the steering system drive that helps move the steering rack as a function of the speed of the vehicle. The steering assistance system reduces the force applied by a driver for steering maneuvers.

The steering assistance system may function as an actuator for more wide-ranging driver assistance tasks; for example, steering movements of a parking assist system. Known parking assistance systems operate semi-automatically or carry out a parking process completely autonomously. In this context, a parking space is measured by sensors and the vehicle is steered automatically into the parking space. A driver may engage or select the parking assistance system to park a motor vehicle. After selection, the steering system carries out the steering process to position the vehicle centrally in a parking space.

A parking assistance system may utilize an EPAS system (Electric Power Assisted Steering) of the vehicle for lateral control to direct the vehicle into the parking space using the data from various sensors. The system may also accelerate and perform braking operations on the vehicle to control longitudinal guidance. The driver can interrupt automatic guidance of the vehicle by intervening with the steering wheel thereby switching between autonomous driving and manual driving. An example includes a steering system for a vehicle changing between autonomous driving and manual driving when the driver pulls the steering wheel towards or away from the driver. Shifting of the steering wheel between the two planes is evaluated as a switching signal.

Other assistance functions also interrupt an automated process upon receiving a driver signal. For example, controlling a steering maneuver such that upon detecting driver intervention a torque superimposition operation in an electrical servo steering system is interrupted. Driver intervention may include using a steering wheel having integrated switches for interaction with the driver.

Using an EPAS system in an automatic parking assistance system causes the steering wheel to follow the steering angle applied by the assistance system during the parking process. During the parking process, a driver's hands are removed hands from the steering wheel and shall not touch it. This can be uncomfortable or unpleasant for the driver, leading to nonuse of the automatic parking assistance system. Continuously confirming the automatic parking process may require activation of an actuation device operating in the manner of a dead man switch. During the autonomous parking process, the actuation device is continuously activated by the driver, when released the parking process is aborted. In certain circumstances, such a parking switch or parking button cannot be easily reached in the vehicle.

SUMMARY OF THE INVENTION

A method for parking a vehicle including a motor vehicle equipped with a steering wheel and at least one steering servomotor with which a steering angle can be applied a steered wheel of the motor vehicle. A control unit actuating the steering servomotor carries out an automatic parking process wherein during the parking process there is no mechanical connection between the steering wheel and the steered wheel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic illustration of a motor vehicle including a parking system and method according to an embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

The features and measures disclosed herein can be combined with one another in any technically appropriate way and disclose further refinements of the invention. The description additionally characterizes and specifies the invention, in particular, with respect to the FIG. 1.

FIG. 1 schematically illustrates a motor vehicle, seen generally at 10, having two front wheels 20, 21 and two rear wheels 22, 23. A front wheel steering system operates to steer the two front wheels 20, 21.

The motor vehicle 10 includes a steering wheel 30 transmitting a driver input steering movement to the steering system of the vehicle. The steering system including a steer-by-wire system (SbW or SbW system). The SbW system including a sensor unit 32 detecting driver input steering provided on the steering column 33 through the steering wheel 30. The sensor unit 32 measuring both steering wheel angle and steering wheel torque and transmitting a corresponding signal to a control unit 11. This control unit 11 actuates, via an electronic data connection, a steering servomotor 50 that steers the two front wheels 20, 21 via a steering gear system 40.

The control unit 11 can also actuate separate servomotors independently of one another, with a separate servomotor assigned to each of the front wheels wherein the front wheels 20, 21 may be turned or swiveled independently of one another. A feedback actuator 31 provided in the region of the steering column 33 conveys a driving and steering sensation to the driver at the steering wheel 30.

There is no mechanical connection between the steering wheel 30 and the front wheels 20, 21; instead, the signal for deflection is transmitted from the control unit 11 via a data connection to the steering servomotor 50 and from there to the wheels 20, 21. In another embodiment, there can be a mechanical connection between the steering wheel 30 and the steering gear system 40; but, the connection can be separated or disconnected. An exemplary mechanical steering connection 60 is illustrated by dashed lines in FIG. 1 and can be embodied in a known fashion.

The control unit 11 is also part of a driver assistance system that can carry out an automatic parking process with the front wheels 20, 21 actuated by the control unit 11. Additionally, the control unit 11 can also access the accelerator pedal and brake (not illustrated) for automatic control. To prepare for and carry out an automatic parking process, the control unit 11 may access environmental sensors (not illustrated) or other vehicle information.

In the disclosed embodiment, when the control unit 11 executes an automatic parking process and turns the front wheels 20, 21 for a steering maneuver, the steering wheel 30 does not follow or track vehicle steering movement when the steering takes place via the steer-by-wire (SbW) steering system. If the motor vehicle has a mechanical connection 60 between the steering wheel 30 and steering gear system 40, rather than a steer-by-wire steering system, the mechanical connection is interrupted; i.e., deactivated, before the automatic parking process.

The steering wheel 30, therefore, remains at a stationary position, for example, a straight-ahead position or no turn input, during the automatic parking process. Alternatively, the steering wheel 30 can be rotated by a motor of the feedback actuator 31, but this rotation is preferably much smaller than the rotation which would occur during customary automatic parking processes without the use of an SbW system. For example, the steering wheel 30 may only rotate a 30 degree hand-wheel angle.

The sensor unit 32 may detect interaction of the driver with the steering wheel 30 during the automatic parking process, which can be evaluated by the control unit 11. Interaction for aborting the automatic parking process can be detected. For example, if the driver applies a steering wheel angle or a steering wheel torque exceeding a predetermined limiting value, which the system differentiates from simple gripping of the steering wheel. In addition, the driver can apply a steering wheel torque directed counter to the steering direction of the parking process. The control unit 11 evaluates these signals of the sensor unit 32 correspondingly aborts the automatic parking process if appropriate, as a result, the driver obtains manual control over the vehicle.

The control unit 11 may also implement a dead man switch or effect based on data from the sensor unit 32. For example, the sensor unit continuously detects whether the driver maintains a predetermined steering wheel angle of the steering wheel, to confirm the automatic parking process. If the steering wheel angle drops below this predetermined limiting value, the system or control unit interprets this as a signal that the driver wants to abort the automatic parking process.

The method relates to an automatic parking process for a motor vehicle wherein the motor vehicle includes a steering wheel and at least one steering servomotor. The steering servomotor applying a steering angle to a steered wheel(s) of the motor vehicle with a control unit actuating the steering servomotor for carrying out an automatic parking process. In one embodiment, during the automatic parking process, there is no mechanical connection between the steering wheel 30 and the steered wheels 20, 21. The steering servomotor 50 operating independently of steering wheel rotation, at least during the automatic parking process.

The automatic parking process can include the entry or exit of a motor vehicle into or from a parking space. In this context, environmental sensors are used in a known fashion to identify and measure a parking space. Based on sensor data, the control unit 11 determines a target position for the motor vehicle in the parking space and the parking process determines a target trajectory for the movement of the motor vehicle. This target trajectory can be changed during the parking process and adapted to the surroundings.

Actuation of a steering servomotor 50 brings about lateral movement of the motor vehicle 10 during the parking process. The steering servomotor 50 is preferably a servomotor of a steering assistance system of the motor vehicle that can also be used for automatic parking processes. The servomotor 50 causes the steered wheels 20, 21 to turn or swivel. In this context, one or more servomotors can be provided to swivel the wheels 20, 21. For example, a servomotor 50 can be provided that adjusts a steering gear system 40, which is connected to the wheels 20, 21. Such a steering gear system 40 may include, for example, a steering rack and a pinion which bears under pressure against a steering rack, which runs transversely with respect to the vehicle. The steering rack is connected at the ends to the wheels via track rods. The pinion is rotated by the steering servomotor 50, causing movement of the steering rack and therefore of the track rods. The wheels swiveled or turn as a function of the movement of the servomotor. However, there can also be a provision that each wheel 20, 21, including the rear wheels 22, 23, can be moved by individual servomotors, associated in each case with each wheel 20-23. In one example, wheels lying opposite one another can be swiveled independently of one another.

The invention can be implemented with the motor vehicle having a steer-by-wire steering system—SbW system. In this steering system, there is no mechanical connection between the steering wheel and the steering servomotor. Instead, the steering movement applied by the driver is detected by a sensor unit and passed onto a control unit. The control unit actuates an actuator, i.e., a steering servomotor, which executes the steering command at the wheels. To provide the driver with a driving and steering sensation, a feedback actuator operates in conjunction with the steering wheel, wherein the feedback actuator applies a self-aligning torque to the steering wheel, the self-aligning torque opposed to the steering torque of the driver. In the disclosed embodiment, the control unit carries out an automatic parking process without the driver moving the steering wheel, and during which the steering wheel does not automatically move when the vehicle wheels turn.

Another embodiment includes a motor vehicle having a steer-by-wire steering system in combination with a power steering system in which there is a mechanical connection between the steering wheel and the steered wheels. A steering servomotor, which can boost the steering movement of the driver, intervenes in this mechanical connection. During an automatic parking process, the mechanical connection between the steering wheel and the steered wheels is disconnected or decoupled before the parking process is carried out. This can be implemented by decoupling elements. If the vehicle is to be operated again in a mode having a mechanical connection between the steering wheel and the steered wheels after the parking process, these elements can be coupled to one another again.

The method can, therefore, be used in motor vehicles exclusively having a steer-by-wire steering system. However, it can also be used in motor vehicles capable of changing between the two described types of power steering, wherein the steer-by-wire steering system is activated for a parking process when necessary.

It is, therefore, possible to bring about a situation in which the steering wheel 30 does not follow the steering movements of the wheels 20, 21 during the automatic parking process. This prevents irritation of the driver, for whom a steering wheel which rotates automatically back and forth could otherwise be unpleasant. The steering wheel of the disclosed example is stationary during the automatic parking process; i.e., does not rotate. It remains in a stationary position, which could be the zero position. However, in one embodiment the steering wheel is rotated by a control unit and a motor during the parking process, the direction of this rotation of the steering wheel corresponding to the steering direction during the parking process. However, this rotation of the steering wheel is preferably less than the rotation necessary to carry out the parking process. The steering direction is merely conveyed to the driver in symbolic form because the amount or degree of steering wheel movement constitutes only a fraction of the necessary rotation. Here, this rotational movement can be freely configured. Excessive rotational movements such as in known parking assistance systems are preferably not carried out.

Besides the automatic parking process controlling steering movements for a lateral movement of the motor vehicle, the drive and the braking of the motor vehicle can also be carried out automatically. In an alternative embodiment of the invention, the parking process takes place semi-automatically, the steering movements taking place automatically, with the driver performing accelerating and braking functions.

The driver can also abort the parking process by interaction with the vehicle. This intervention takes place, for example, through the steering wheel and/or the brake pedal. Interaction of the driver with the steering wheel during the automatic parking process can be detected by a rotational angle sensor and/or a torque sensor on the steering column. In one embodiment of the invention, the automatic parking process is aborted if the interaction of the driver with the steering wheel is detected by a sensor. In this context, the system preferably differentiates between whether the driver has only gripped the steering wheel or whether the driver is carrying out a steering movement by rotating the steering wheel. Merely gripping the steering wheel does not necessarily cause the automatic parking process to be aborted. Instead, the parking process can be carried out with the driver's hands on the steering wheel. Rotation of the steering wheel likewise does not necessarily cause the automatic parking process to be aborted if the steering torque applied in this context is only small. There can be a provision that the parking process is only aborted starting from a specific limiting value.

There may be other or additional conditions that must be satisfied for the automatic parking process to be aborted. In one embodiment, the automatic process of entering a parking space is, for example, aborted if it is detected by a sensor unit that the driver applies a steering torque to the steering wheel and/or activates the brake of the motor vehicle. Both processes can be evaluated individually, or in combination, to determine if the driver wants to abort the automatic parking process and assume manual control of the motor vehicle. This can be the case during an automatic parking process.

In a further embodiment, the automatic parking process is aborted if a sensor unit detects that the driver applies a steering torque to the steering wheel whose rotational direction is opposed to the steering direction. For example, it can be basically possible for the driver to steer "with the system." However, if the driver steers actively against the system, this is evaluated as an indication that the driver wants to abort the automatic parking process and assume manual control of the motor vehicle. This can also be the case during an automatic parking process.

The specified possibilities for aborting the automatic parking process increase the comfort and the sensation of trust for the driver during an automatic parking process. The driver's comfort can be increased with the invention by further measures. For example, with an SbW system, it is possible to replace an actuation device as a dead man switch, which otherwise has to be kept activated by the driver to continuously confirm the automatic parking process. The dead man function can be implemented with an SbW system. For example, there can be a provision that the driver must keep the steering wheel above a specific steering wheel angle to confirm that the parking process is to be continued. This can be, for example, 5° starting from the central position or zero position. The automatic parking process is carried out if the driver keeps the steering wheel above this steering wheel angle. A counter-torque by the SbW system ensures that the driver is always within the control loop. This counter-torque can be, for example, approximately 2 Nm.

Such a dead man function can be activated more easily and comfortably by the driver as a separate dead man switch which, under certain circumstances, can be reached only with difficulty. In contrast, the steering wheel can be easily reached and can be gripped comfortably. In contrast with such a dead man function, during an automatic parking process, the speed and/or the direction of travel can also be controlled. The maximum vehicle speed can be controlled based on the applied steering wheel angle, and the direction of travel can be controlled based on the steering direction.

Also, during automatic parking, the optimum target position for the vehicle in a parking space is not always found. For example, the distance from a curb can be too large or too small. In addition, the vehicle may not be in a straight position in a parking space; i.e., the parking angle is not well selected. The SbW system can be input, but the driver can carry out corrections. For example, the control unit bases the automatic parking process on a target position into which the motor vehicle is to be moved. When a steering torque is applied to the steering wheel by the driver, this target position is shifted in the direction of the steering torque by the control unit. If the driver steers to the left, the ultimate target position is shifted to the left. If the driver steers to the right, the ultimate target position is shifted to the right. The shifting and correction of the target position can relate to the applied steering angle with or without considering the time.

In a further embodiment of the invention, the parking angle is corrected by the SbW system. The parking angle is the angle between the longitudinal axis of the motor vehicle and the longitudinal axis of a parking space. The driver applies a steering wheel angle to the steering wheel, which steering wheel angle is used to correct the parking angle.

The driver assistance system includes a parking assist function enabling automatic entry and/or exit of a motor vehicle into and from a parking space. The driver assistance system including a control unit designed to carry out a method according to an embodiment of the invention. A motor vehicle with such a driver assistance system provides a high level of driving comfort to a driver. Because acceptance of the driver assistance system being used is increased, it results in a system used more frequently.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for parking a vehicle comprising:
   a motor vehicle equipped with a steering wheel and at least one steering servomotor with which a steering angle can be applied to a steered wheel of the motor vehicle;
   a control unit actuating the steering servomotor for carrying out an automatic parking process wherein during the automatic parking process there is no mechanical connection between the steering wheel and the steered wheel; and
   the steering wheel remains stationary and oriented in a central position during the automatic parking process.

2. The method of claim 1 wherein any mechanical connection between the steering wheel and the steered wheel is disconnected before the automatic parking process is carried out.

3. The method of claim 1 wherein the automatic parking process is aborted if interaction of a driver with the steering wheel is detected by a sensor.

4. The method of claim 1 wherein the automatic parking process is aborted if a sensor detects a driver applied torque to the steering wheel.

5. The method of claim 1 wherein the automatic parking process is aborted if a sensor detects a driver applied steering wheel rotational torque whose rotational direction is opposed to the steering direction.

6. The method of claim 1 wherein the automatic parking process continues as long as a driver keeps the steering wheel above a specific steering wheel angle.

7. The method of claim 1 wherein the control unit bases the automatic parking process on a target position, and when a steering torque is applied to the steering wheel by a driver said target position is shifted in the direction of the steering torque by the control unit.

8. A system for parking a motor vehicle comprising:
   a steering wheel and a steering servomotor applying a steering angle to a steered wheel of the motor vehicle;
   said steering wheel and said steered wheel having no mechanical connection between them; and
   a control unit actuating the steering servomotor for carrying out an automatic parking process wherein said steering wheel returns to a central position and remains stationary during the automatic parking process.

9. The system of claim 8 including a decoupling element between said steering wheel and said steered wheel to decouple any mechanical connection between said steering wheel and said steered wheel prior to the automatic parking process.

10. The system of claim 9 including a sensor detecting any interaction between a driver and the steering wheel said sensor, and sending an interaction signal to said control unit; and
   said control unit aborting the automatic parking process upon receiving said interaction signal from said sensor.

* * * * *